May 15, 1923.
E. MULLER
VEHICLE WASHER
Filed May 17, 1919
1,455,349
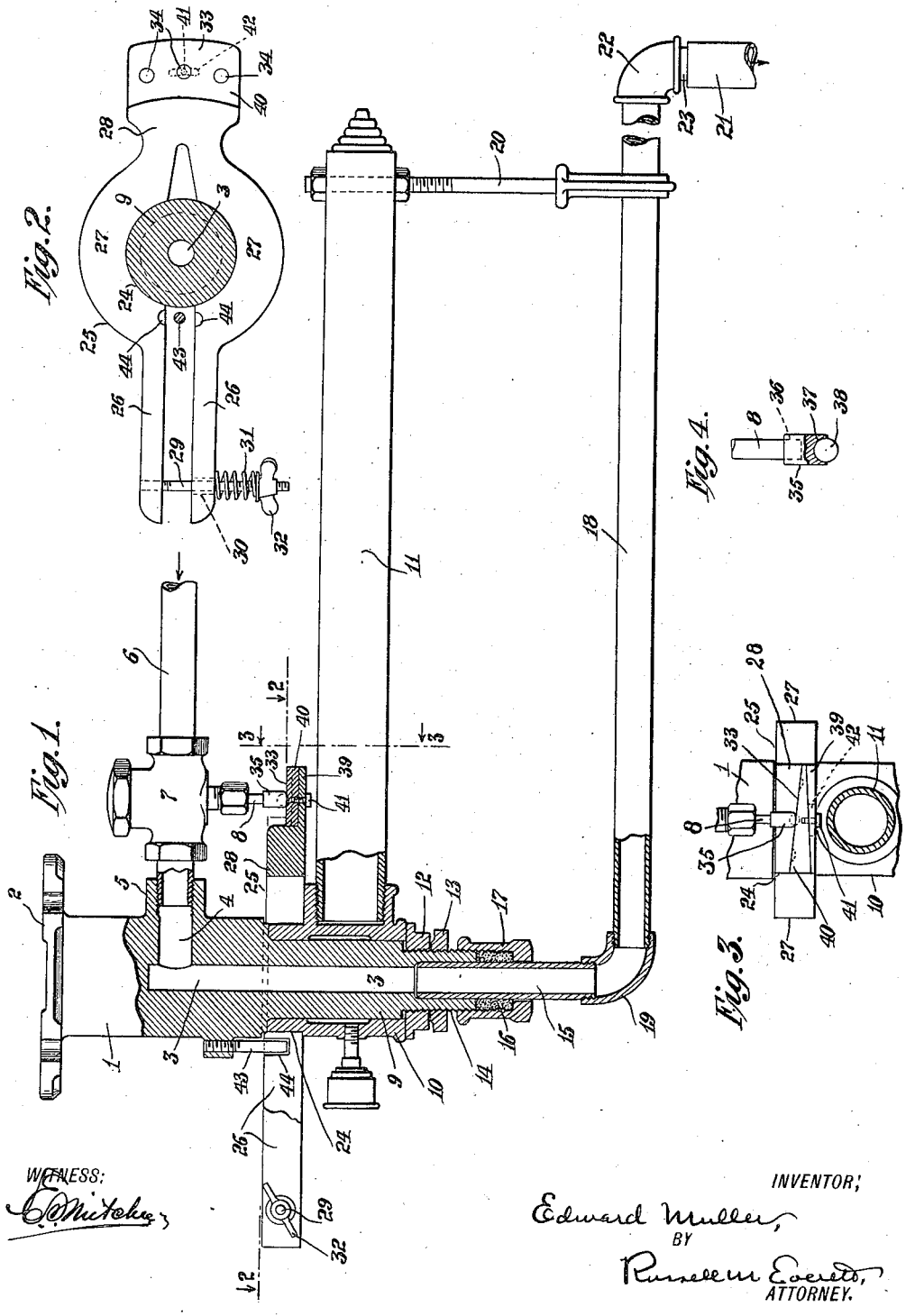
INVENTOR;
Edward Muller,
BY
Russell M Everett,
ATTORNEY.

Patented May 15, 1923.

1,455,349

UNITED STATES PATENT OFFICE.

EDWARD MULLER, OF NORTH BERGEN, NEW JERSEY.

VEHICLE WASHER.

Application filed May 17, 1919. Serial No. 297,720.

*To all whom it may concern:*

Be it known that I, EDWARD MULLER, a citizen of the United States and a resident of North Bergen, in the county of Hudson and State of New Jersey, have invented new and useful Improvements in Vehicle Washers, of which the following is a specification.

This invention relates more particularly to that type of vehicle washer in which the delivery pipe is rotatably secured to a fixed water supply upon the ceiling or an overhead support, and in which the flow of water is controlled by manipulation of the delivery pipe or hose.

The objects of the invention are to enable the water supply to be controlled by the delivery pipe in any position within its range of movement; to enable such control to be effected by only a very slight angular motion of the delivery pipe; to enable rotation of the delivery pipe to take place when desired without affecting the water supply; to secure a frictional connection between the rotating delivery pipe and the water control means; to enable such frictional connection to be adjusted as desired; to provide suitable limits for movement of the control device with the delivery pipe; to enable the control means to be adjusted to different valves, and to secure other advantages and results as may be brought out in the following description.

Referring to the accompanying drawings, in which like numerals of reference indicate the same parts throughout the several views, Figure 1 is a side elevation, partly in central section, of a vehicle washer of my improved construction;

Figure 2 is a horizontal section of the same on line 2—2, Fig. 1;

Figure 3 is a cross-section on line 3—3 Fig. 1; and

Figure 4 is a detail view of a ball shoe for the end of the valve stem.

In the specific embodiment of the invention shown in said drawings, 1 indicates a depending support adapted to be secured to the ceiling or other overhead support by a base or foot 2, said support having for its lower portion a central longitudinal passage 3 for water which at its upper end turns outwardly, as at 4 through a boss 5 on the support which is adapted to receive a water supply pipe 6, in which is located a shut-off valve 7 whose stem 8 is normally projected to hold the valve closed by a spring (not shown) as is common in the art.

Below the point where the water supply pipe 6 joins the support 1, said support has a reduced portion 9 which rotatably receives a sleeve 10 with a lateral horizontally projecting arm 11, and this sleeve is held upward in place by means of a nut 12 and lock nut 13 beneath the same upon a further reduced and threaded portion 14 of the support 1. The lower end of the support receives a nipple 15 surrounded by packing 16 and a packing gland 17 screwed onto said reduced end of the support to prevent leakage around the nipple, and from the lower end of said nipple extends the delivery pipe which is here shown in the usual form comprising a horizontal portion 18 connected to the nipple 15 by an elbow 19 and supported near its other end by a hanger 20 from the arm 11, the hose 21 connecting at the end of the horizontal pipe 18 beyond said hanger by means of an elbow 22 and any suitable kind of a nipple 23. It will be understood that the hanger 20 rigidly connects the pipe 18 and arm 11 so that they rotate together, in either direction upon the support 1 according as the hose is pulled, the sleeve 10 turning upon the reduced portion 9 of the support, and the nipple 15 turning in its socket and packing.

Coming now to the invention, I provide at the upper end of the sleeve 10 a reduced portion 24 to receive a valve operating or controlling member 25, which as shown most clearly in Figure 2 comprises a body portion adapted to frictionally receive the reduced portion 24 and a radial extension to engage the valve stem 8. Means are also preferably provided for adjusting the friction between said controlling member 25 and the sleeve 10, it being desired to have the friction such that when the sleeve is first turned, by pulling upon the hose, the valve controlling member turns with it to open or close the valve, according to the direction of turning, and then allows the sleeve to turn independent of the valve controlling member. Positive stop means are preferably provided for limiting the movement of said valve controlling member with the sleeve 10, as will be described more fully.

While my invention may be embodied in various forms, I have shown for illustration the valve control member 25 with arms 26, 26 which are bowed apart as at 27, 27 near their integral connection by the extension 28 and adapted to receive between themselves the reduced portion 24 of the support 1. In order to control the frictional engagement of said arms with said support, the outer ends of the arms are provided one with a bolt 29 extending loosely through a hole 30 in the other and receiving outside said other arm a spring 31 and wing nut 32 by means of which the arms can be clamped together.

The extension 28 is adapted to lie beneath the valve stem 8 and is widened transversely so as to always do this notwithstanding the angular movement of the control member 25. Said extension provides an upper transversely beveled or inclined contact surface 33 with sufficient difference in height between its opposite end portions so that one of them will allow the valve stem 8 to project entirely into closed position of the valve and the other will force the valve stem inwardly to open the valve. Thus as the valve control member 25 is swung one way or the other the valve will be opened or allowed to close, and if desired steps or seats 34 can be provided in the inclined surface to determine more definitely certain positions of the valve, such as open, half open and closed.

In order to reduce frictional engagement of the valve stem with the control member 25, I prefer to provide the valve stem with a shoe 35 which I have shown as simply a cylindrical piece with a socket 36 in its upper end for the stem and a seat 37 in its lower end for a ball 38. Also, in order to enable the engaging surface of the extension 28 to be adjusted with respect to the valve stem, I prefer to provide said extension with a main portion 39 beveled or inclined in one direction and upon which lies an adjustable wedge-shaped portion 40 correspondingly inclined at its lower surface and oppositely inclined at its upper surface; a clamping screw 41 extends through a slot 42 in the extension portion 39 and is threaded into the adjustable wedge 40, so that said wedge may be adjusted as desired to properly accommodate the length of the valve stem 8.

The stop, hereinbefore mentioned, for limiting movement of the valve control member 25 with the sleeve 10 I have shown as a pin or projection 43 depending from the fixed support 1 into recesses 44, 44 in the opposite facing walls of the arms 26, 26, at the upper side of the control member, see Figures 1 and 2, and it will be understood that this ensures that after the valve has been opened or closed by movement of the valve control member with the sleeve 10, said valve control member remains stationary as to any further turning of the sleeve in the same direction.

In using my improved washer, the water can be turned on and shut off by a very slight angular motion of the sleeve 10 and arm 11, which is easily effected by pulling on the hose. It will be noted that the angular motion necessary to do this is only a few degrees, and thus it is most conveniently done. Furthermore, it makes no difference in what angular position the sleeve and arm 11 stand, the slight movement of them in one direction or the other will always open or close the water supply valve. After the water has been turned on, the hose can be carried on in the same direction as far as desired, and if desired to carry it in a reverse direction the only effect will be to first shut off the water so that when the hose reaches its desired position a slight reverse movement is necessary to turn on the water again. Unrestricted freedom of movement of the hose is thus provided together with absolute control of the water, conducing to great ease and convenience in manipulation of the washer and to great economy of water.

As I have indicated, various detail modifications and changes may be made in manufacturing my improved washer without departing from the spirit and scope of the invention, by those skilled in the art, and I do not wish to be understood as restricting myself except as required by the following claims when construed in the light of the prior art.

Having thus described the invention, what I claim is:

1. The combination with a support having a valved water supply and a movable delivery pipe, of a valve-controlling member movable with said delivery pipe for a part only of the full extent of the movement of the latter to open and close the valve of the water supply.

2. The combination with a support having a valved water supply and a movable delivery pipe, of a valve-controlling member, frictionally movable with said delivery pipe to an extent less than the full extent of movement of said delivery pipe and transmitting said motion to the valve of the water supply.

3. The combination with a support having a valved water supply and a movable delivery pipe, of a valve-controlling member frictionally movable with said delivery pipe and transmitting said motion to the valve of the water supply, and means for limiting the movement of said valve-controlling member to an extent less than the full extent of the movement of said delivery pipe.

4. The combination with a support having a valved water supply and a rotatable delivery pipe, of a valve-controlling member having a movement with said delivery pipe during a part only of the rotation thereof to open and close the valve of the water supply.

5. The combination with a support having a valved water supply and a rotatable delivery pipe, of a valve-controlling member frictionally receiving a motion from said delivery pipe during a part only of the rotation thereof and transmitting said motion to the valve of the water supply.

6. The combination with a support having a valved water supply and a rotatable delivery pipe, of a valve-controlling member frictionally rotated by rotation of the delivery pipe to open and close the valve of the water supply.

7. The combination with a support having a valved water supply and a rotatable delivery pipe, of a valve-controlling member frictionally rotated by rotation of the delivery pipe, and stop means limiting rotary movement of said member.

8. The combination with a support having a valved water supply and a rotatable delivery pipe, of a valve-controlling member frictionally receiving a limited motion from said delivery pipe and transmitting said motion to the valve of the water supply, and means for regulating said frictional transmission of motion from the delivery pipe to said member.

9. The combination with a support having a valved water supply, a rotatable sleeve on said support, and a delivery pipe arm on said sleeve, of a valve-operating member mounted on the upper end of said sleeve to move therewith, and stop means for limiting motion of said valve-operating member with said sleeve.

10. The combination with a support having a valved water supply, a rotatable sleeve on said support, and a delivery pipe arm on said sleeve, of a valve-operating member mounted on the upper end of said sleeve in frictional engagement therewith, and stop means for limiting motion of said valve-operating member with said sleeve.

11. The combination with a support having a valved water supply, a rotatable sleeve on said support, and a delivery pipe arm on said sleeve, of a valve-operating member having a body portion frictionally engaging the upper part of said sleeve, and means for adjusting such frictional engagement.

12. The combination with a support having a valved water supply, a rotatable sleeve on said support, and a delivery pipe arm on said sleeve, of a valve-operating member frictionally engaging said sleeve so as to turn therewith and operate the valve as the arm begins to swing, and a fixed stop projecting from the support to be engaged by said member and stop the same at the opposite limits of its movement.

13. The combination with a support having a water supply with a valve having a reciprocating stem, of a delivery pipe rotatable on said support, and a valve-operating member having a limited movement with said delivery pipe in a plane substantially perpendicular to said stem and having a cam surface engaging the stem.

14. The combination with a support having a water supply with a valve having a reciprocating stem, of a delivery pipe rotatable on said support, and a valve-operating member having a limited movement with said delivery pipe in a plane substantially perpendicular to said stem and having a cam surface engaging the stem and provided with depressions for receiving said stem in certain positions.

15. The combination with a support having a water supply with a valve having a reciprocating stem, of a delivery pipe rotatable on said support, a valve-operating member having a limited movement with said delivery pipe in a plane substantially perpendicular to said stem and having a cam surface engaging the stem, and means for adjusting said cam surface with respect to the valve stem.

16. The combination with a support having a water supply with a valve having a reciprocating stem, of a delivery pipe rotatable on said support, a valve-operating member having a limited movement with said delivery pipe in a plane substantially perpendicular to said stem and having a surface inclined to said stem, a wedge-shaped piece on said inclined surface, and means for adjustably holding said wedge-shaped piece.

EDWARD MULLER.